F. O. TIBBETTS.
SHOCK ABSORBER.
APPLICATION FILED APR. 16, 1917.
1,292,155.
Patented Jan. 21, 1919.
2 SHEETS—SHEET 1.
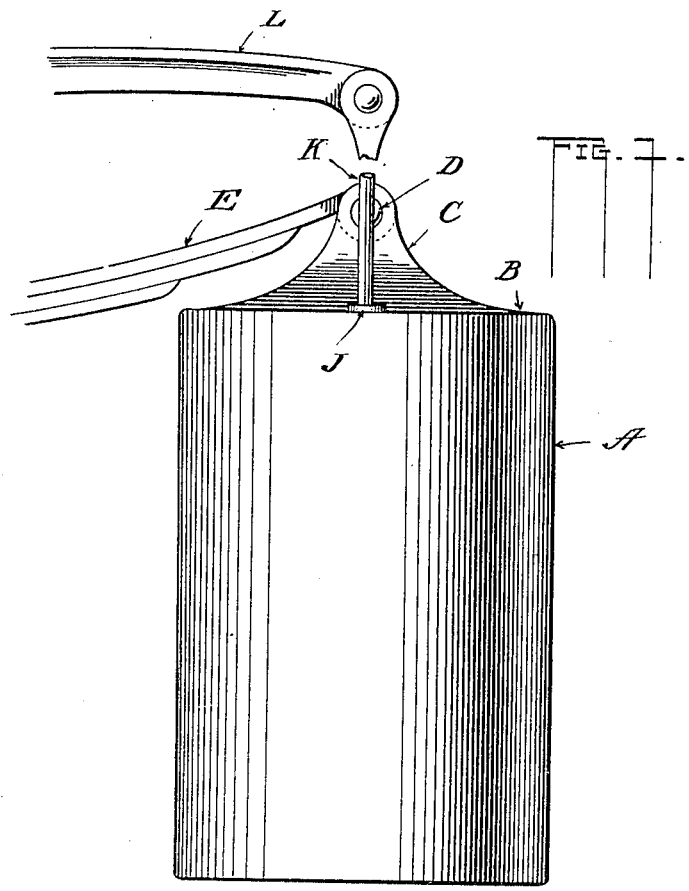
Witnesses:
Marie Dacey
Louise H. Masch
Inventor:
Fred O. Tibbetts,
By L. M. Thurlow
Atty.

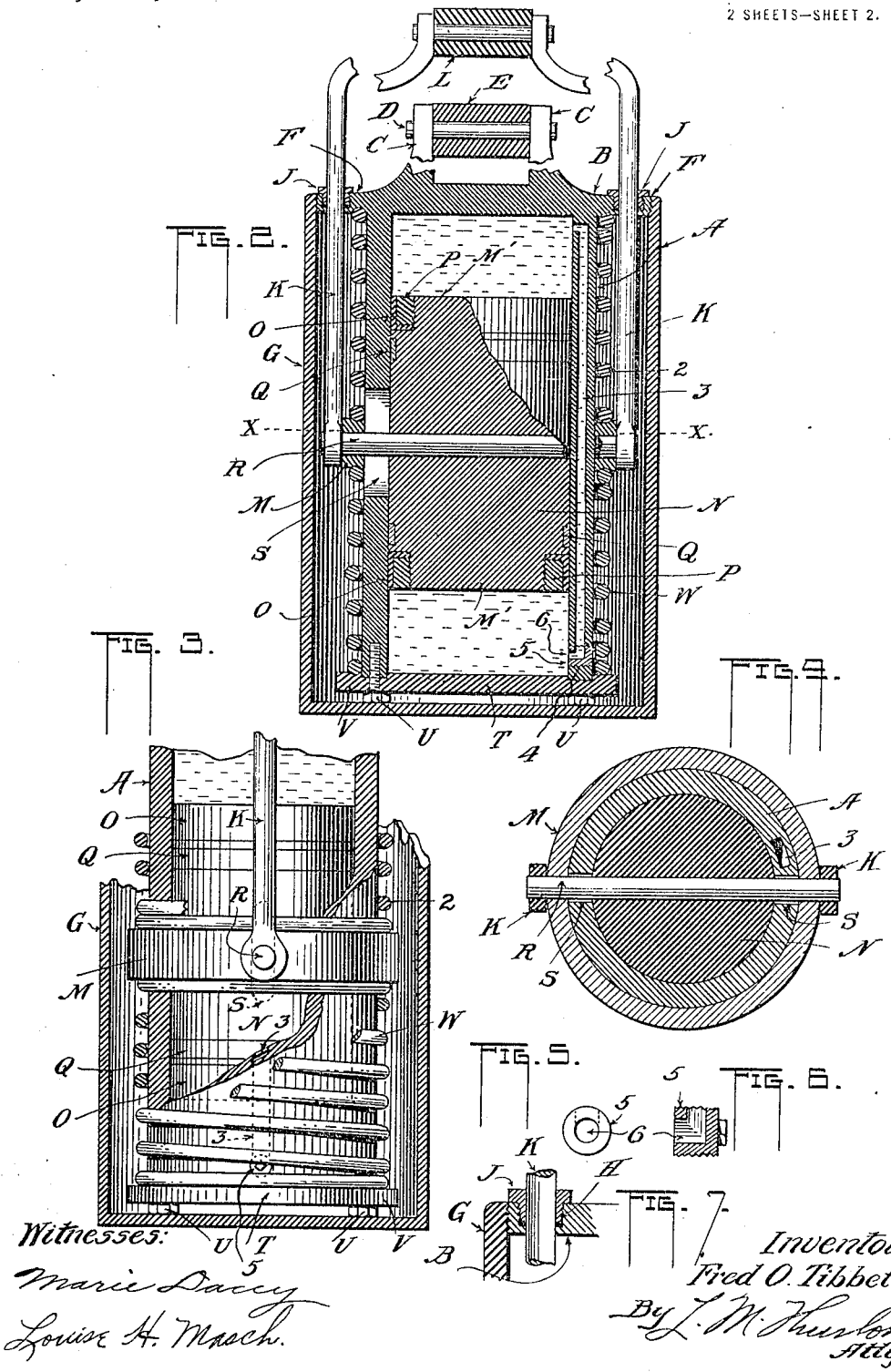

UNITED STATES PATENT OFFICE.

FRED O. TIBBETTS, OF HENRY, ILLINOIS, ASSIGNOR OF ONE-THIRD TO HENRY E. JACOBS, OF HENRY, ILLINOIS, AND ONE-THIRD TO GEORGE A. KUTZ, OF PEORIA, ILLINOIS.

SHOCK-ABSORBER.

1,292,155.    Specification of Letters Patent.    Patented Jan. 21, 1919.

Application filed April 16, 1917. Serial No. 162,513.

*To all whom it may concern:*

Be it known that I, FRED O. TIBBETTS, citizen of the United States, residing at Henry, in the county of Marshall and State of Illinois, have invented certain new and useful Improvements in Shock-Absorbers; and hereby declare that the following is a full, clear, and exact description of the invention, which will enable others skilled in the art to which it appertains to make and use the same.

This invention relates to shock absorbers having particular reference to devices of this character for attachment between the frame of a vehicle and its springs.

The main object of the invention is the combination, in a shock absorber, of an elastic member for absorbing the initial shock imparted to the vehicle by road obstructions and a piston controlled by a fluid to steady the operation and control the rebound by which means a more perfect absorbing of the shocks will result, giving a consequent smoothness of operation during both the downward and upward movement.

Another object is the combination in a shock absorber of elastic members and a fluid placed under pressure by a piston, together with a by-pass adapted by a suitable control thereof to permit passage of more or less of the fluid whereby the absorber may be readily adapted for attachment to vehicles of any weight.

Another object is to furnish a shock absorber whose parts are all inclosed so as to be as nearly dust-proof as possible whereby the life of the working parts thereof will be greatly prolonged.

Other objects and advantages will appear in the following specification, aided by the accompanying drawing, wherein, Figure 1 is an elevation of the complete shock absorber, showing its connection with the frame and spring of a vehicle.

Fig. 2 is a vertical section of the complete shock absorber.

Fig. 3 is an elevation in part section of portions of the shock absorber, seen from a different position from that shown in Fig. 2.

Fig. 4 is a horizontal section on line *x—x* Fig. 2.

Fig. 5 is a plan of a plug for changing the size of a by-pass.

Fig. 6 is a vertical section of the same; and

Fig. 7 is a vertical section of a part of the device.

A is a cylinder including a head B closing one end, which head has a pair of spaced ears C through which extends a pin D which likewise passes through the eye of a spring E that supports the vehicle frame. The said head B is extended beyond the outer wall of the cylinder forming a flange F threaded to receive an inclosing shell or case G to be more fully touched upon later herein. The said flange is provided with two threaded apertures H for receiving a threaded plug J, Fig. 7, serving as a packing-gland through each of which a rod K passes, each of which at its upper end is attached to a portion of the vehicle frame L, the said rods lying at opposite sides thereof.

M is a ring or annulus to slip over the outside of the cylinder and adapted to move upon the same, the lower ends of the rods K being fixed relatively thereto as will appear later herein.

N is a piston provided at each end with a cup-leather O forming a packing-ring which is secured in place by a threaded ring P, for example, engaging threaded reduced extensions M' of said piston, the latter being provided also with piston-rings Q, if desired.

Extending through the piston is a pintle R which likewise extends through the walls of the cylinder and the described ring M and receives at each end one of the rods K previously described. The walls of the cylinder are slotted as indicated at S to permit the pintle to move up and down therein in the movements of the piston.

T is a head secured to the lower end of the cylinder by means of cap-screws U, for example, said head having an extended flange portion V outside the cylinder and corresponding to the flange F of the head B. A spring W is interposed between the extended flange portion V and the described ring or annulus M, and a spring 2 is interposed between the latter and the said flange F of the head B.

3 is a passage extending longitudinally through the wall of the cylinder, its ends terminating within the cavity of the latter at opposite ends. Near one end of the cylinder is a threaded bore 4 communicating with the described passage 3 adapted to receive a threaded plug 5 having a passage 6 through it, one end communicating with the interior of the bore of the cylinder, its other end communicating with the passage 3 when the plug is screwed into its proper position. The plug may be provided with a squared portion to receive a wrench or may otherwise be fitted so that it can be readily removed or inserted.

The described casing G is cast in one piece being threaded to take over the threaded flange F entirely incloses the cylinder A and its parts and its lower end may abut upon the cap-screws U which retain the head in place and prevents them from loosening. This casing entirely prevents dust and dirt getting to the cylinder.

The operation of my absorber is as follows:

The spring W is of a strength sufficient to support the load under ordinary conditions as when running on a smooth road surface, or when the vehicle is standing, maintaining the piston substantially midway of its travel or in the middle of the length of the cylinder. A shock transmitted to the vehicle spring E through the axle, not shown, is met by the lower spring W which is compressed between the lower head T and the ring or annulus M since the tendency of the spring E is an upward one. The cylinder A must, therefore, be lifted since attached to the spring E, the slots S permitting said cylinder to move relatively to the pintle R. The oil in the bottom of the cylinder is placed under compression, since the piston remains stationary with the frame, and forced through the passage 6 of the plug into and through the passage 3 to the upper portion of the cylinder bore. This movement of the oil is more or less rapid according to the area of the passage 6 of said plug and receives the thrust and steadies the action. In the rebound the spring 2 takes the thrust as the frame L tends downwardly toward the spring E. The upper end of the piston now, in turn, causes the oil to travel in the other direction or downwardly out of the plug 5. These actions then alternately repeat themselves until the whole structure comes to rest and normal conditions are restored.

My device is adaptable to cars of all weights since the springs W and 2 may be of a size and strength to suit cars up to a certain weight and others may be substituted therefore for heavier cars. The plug 5 is removable so that the size of bore 6 may be suited to all weights of cars.

The passage 3 is of sufficient capacity to provide for the largest bore in the plug 5. If desired, the plug may be provided with indicating marks that may be brought opposite a mark upon the cylinder whereby the outlet of the bore 6 to the passage 3 may be changed at will without substituting one plug for another, each mark upon the plug corresponding to a certain weight of vehicle, all of which is predetermined, but this is all within the meaning of the invention. For simplifying purposes and in order that no mistakes may be made it is preferable to have a series of the plugs, each of which corresponds to a certain weight of vehicle.

I am aware that it is not new to provide for the movement of a fluid in a cylinder from one side of its piston to the other directly past the piston itself but I believe that it is new to provide a by-pass which can be restricted at will or enlarged as wanted to provide for various weights. Knowing the weight of a vehicle and the flexibility of its springs a plug having a bore of a predetermined area may be inserted and the device can be placed upon the car with the assurance that in that condition it will best serve its purpose for that vehicle and by providing a plug for each of the known makes of cars the installation is quite simple.

Various changes may be made throughout the device as may suggest themselves to the practical person without departing from the spirit and intent of the invention and without departing from the scope of the accompanying claims.

It is preferable to place the by-pass 3 in the wall of the cylinder in order that it will not interfere with the placing or movement of the spring W, 2, or otherwise be in the way.

It is desired to call especial attention to the dust-proof feature of my shock absorber. The piston having proper leak-proof rings will prevent the oil finding its way between it and the cylinder and through the slots S but any leakage will be received by the shell or case G and the packing-glands J prevent dust from entering the said case so that contrary to many devices of which I am aware, the working parts are wholly protected so that long life is assured. Furthermore, there can be no leakage of oil upon any of the parts of the vehicle since it is permanently retained within the device.

When once installed with the proper working conditions, the springs W and 2 and the plug 5 being of proper size for the particular car on which devices are installed, no attention is required and the very best results are realized.

Having thus described my invention, I claim:—

1. In a shock absorber, the combination of a fluid containing cylinder adapted to be attached to a part of a vehicle, a piston therein, a bail operatively engaging the piston outside the cylinder and adapted for attachment to another part of the vehicle, there being a by-pass connecting the cylinder outward from each limit of travel of the piston, and a dust tight inclosure covering the cylinder and the inner portion of the bail, said bail extending outside said inclosure.

2. In a shock absorber, the combination of a fluid containing cylinder adapted to be attached to a part of a vehicle, a piston therein, a bail operatively engaging the piston outside the cylinder and adapted for attachment to another part of the vehicle, there being a by-pass connecting the cylinder outward from each limit of travel of the piston, a dust tight inclosure covering the cylinder and the inner portion of the bail, said bail extending outside said inclosure, and a pair of opposed springs operatively engaging the piston and cylinder.

3. In a shock absorber, the combination of a cylinder for containing a fluid having at one end a flange, said cylinder including a by-pass connecting the ends of its bore, and provided at two diametrically opposite sides with a slot which lengthwise lies parallel to the axis of the cylinder bore, said cylinder being adapted to be attached to a part of a vehicle, a piston having a trunnion extending from each side thereof through one of the slots, a bail engaging the ends of the trunnions outside the cylinder and adapted for attachment to another part of the vehicle, and a pair of springs each operatively engaging the trunnions at one end, the other ends of the springs being fixed relatively to the cylinder, and an inclosure entirely covering the cylinder and part of the bail and having threaded engagement with the described flange, the bail extending outside the inclosure at the end attached to the flange.

4. In a shock absorber, the combination of a cylinder for containing a fluid including a by-pass in its wall opening at its ends into opposite ends of the cylinder bore, said cylinder adapted for attachment to a part of a vehicle, a piston movable between the outlets of the by-pass, said cylinder having a slot in its wall at two diametrically opposite sides, an extension at diametrically opposite sides of the piston protruding through the described slots, a bail engaging the extensions and adapted to be attached to another part of the vehicle, and a pair of springs each fixed at one end relatively to the cylinder and operatively engaging at their other adjacent ends the extensions.

5. In a shock absorber, the combination of a cylinder for containing a fluid adapted to be attached to a part of a vehicle and including a by-pass opening at its ends into opposite ends of the bore of the cylinder, means to vary the size of said by-pass, said cylinder having a slot through its walls at substantially the middle of its length at diametrically opposite sides, a piston, a part extending from opposite sides of said piston and fixed relatively to the same and extending through the said slots in the cylinder wall, an annulus inclosing the cylinder, the described part extending therethrough, a pair of spaced opposed springs encircling the cylinder and each bearing at one end upon said annulus, the other ends of the springs being fixed relatively to the cylinder, and a bail engaging the ends of the described part and adapted for attachment to another part of the vehicle.

6. In a shock absorber, the combination of a cylinder adapted for attachment to a part of a vehicle and including at one end a flange extending beyond its walls and including at its other end a detachable head having an extended flange beyond the wall of the cylinder, there being a by-pass connecting the ends of the cylinder bore, the cylinder being provided with a slot at diametrically opposite sides which lie parallel to the axis of the bore, a piston, a pintle carried by the same extending through said slots, an annulus inclosing the cylinder, the ends of the pintle extending through diametrically opposite sides of the annulus, a spring interposed between the annulus and each of the described flanges, and a bail engaging the ends of the said pintle adapted for attachment to another part of the vehicle.

7. In a shock absorber, the combination of a cylinder including a by-pass opening into each end of its bore, each end of the cylinder including a flange extended from its wall, said cylinder having a slot in its walls at two diametrically opposite sides disposed parallel to the axis of the bore, a piston, a pintle extending at diametrically opposite sides therefrom through the described slots, an annulus inclosing the cylinder and movable upon the same and fixed relatively to the pintle, a spring interposed between the annulus and each of the described flanges, a bail engaging the ends of the pintle, the arms of said bail extending through one of the described flanges, and a casing inclosing the before mentioned structure and engaging the last mentioned flange.

8. In a shock absorber, the combination of a cylinder including a by-pass opening into each end of the bore, each end of the cylinder head including an extended flange, and having a slot in its wall at two diametrically opposite sides disposed parallel to the axis of the bore, a piston, a pintle extending at diametrically opposite sides therefrom through the described slots, an annulus inclosing the cylinder and movable along the same and fixed relatively to the pintle, a spring interposed between the annulus and each of the described flanges, a bail engaging the ends of the pintle, a casing inclosing the before mentioned structure and engaging one of the flanges, and packing-glands adjustable in one of said flanges, the arms of the bail extending through the same.

9. In a shock absorber, the combination of a cylinder for containing a fluid and having a by-pass opening into each end of its bore, the walls of said cylinder having a slot at diametrically opposite sides lying parallel to the longest axis of the bore, a piston, a pair of springs operatively engaging the piston and the cylinder and acting in opposite directions, trunnions on the piston extending through the described slots, a bail engaging the trunnions outside the cylinder, and a removable plug for the said cylinder having a bore communicating with the said by-pass.

In testimony whereof I affix my signature, in presence of two witnesses.

FRED O. TIBBETTS.

Witnesses:
E. J. ABERSOL,
L. M. THURLOW.

Copies of this patent may be obtained for five cents each, by addressing the "Commissioner of Patents, Washington, D. C."